United States Patent
Kim

(10) Patent No.: US 7,394,778 B2
(45) Date of Patent: Jul. 1, 2008

(54) MAPPING OF POINT OF MULTIPOINT SERVICE IDENTIFICATIONS

(75) Inventor: Myeong-Cheol Kim, Aachen (DE)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 11/104,892

(22) Filed: Apr. 12, 2005

(65) Prior Publication Data
US 2005/0237960 A1    Oct. 27, 2005

Related U.S. Application Data

(60) Provisional application No. 60/561,943, filed on Apr. 12, 2004.

(51) Int. Cl.
*H04J 3/24* (2006.01)
(52) U.S. Cl. ........................ 370/312; 370/349
(58) Field of Classification Search ................. 370/312, 370/349, 270, 271; 455/414.1, 503
See application file for complete search history.

(56) References Cited

U.S. PATENT DOCUMENTS

| | | | |
|---|---|---|---|
| 6,965,579 B1* | 11/2005 | Shin | 370/312 |
| 2003/0157949 A1* | 8/2003 | Sarkkinen et al. | 455/503 |
| 2003/0194992 A1 | 10/2003 | Kim et al. | |
| 2004/0017809 A1 | 1/2004 | Park | |
| 2004/0022218 A1 | 2/2004 | Kim et al. | |
| 2004/0057387 A1 | 3/2004 | Yi et al. | |
| 2004/0156330 A1 | 8/2004 | Yi | |
| 2005/0076369 A1* | 4/2005 | Cai et al. | 725/62 |
| 2006/0019641 A1* | 1/2006 | Vayanos et al. | 455/414.1 |
| 2006/0156370 A1* | 7/2006 | Parantainen | 725/132 |

\* cited by examiner

*Primary Examiner*—Edward F. Urban
*Assistant Examiner*—Adeel Haroon
(74) *Attorney, Agent, or Firm*—Lee, Hong, Degerman, Kang & Schmadeka

(57) ABSTRACT

The present invention is a method for identifying a point-to-multipoint service. When a plurality of point-to-multipoint services are multiplexed to one transport channel, a temporary service identifier (TSI) is defined and inserted into a MAC PDU header so that the plurality of point-to-multipoint services can be individually identified. Thus, overhead is reduced and multiple services having a different quality of service (QoS) or multiple streams of different QoS in the same service can be handled and provided to a mobile terminal.

22 Claims, 13 Drawing Sheets

FIG 9A
FIG 9B

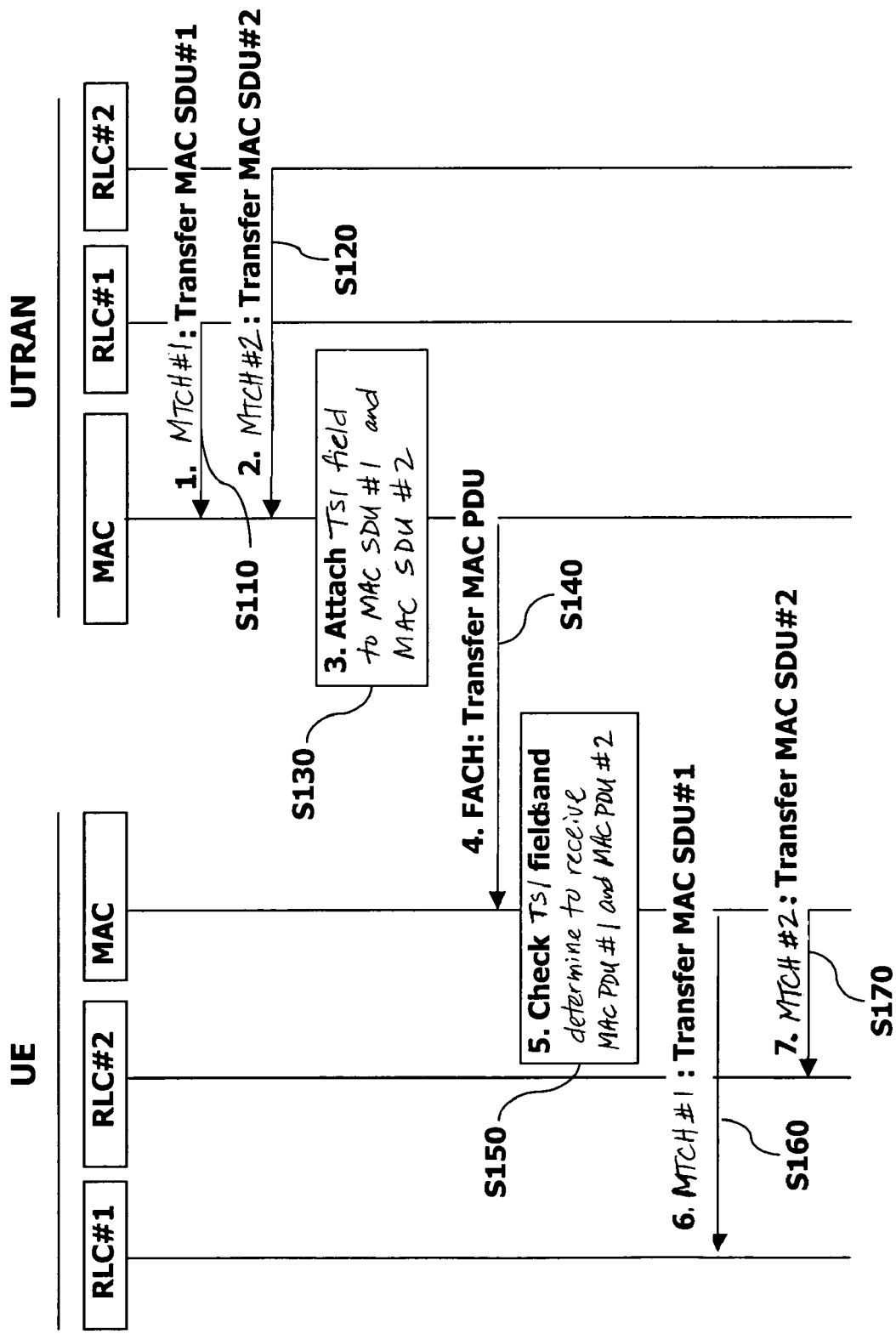

MAPPING OF POINT OF MULTIPOINT SERVICE IDENTIFICATIONS

CROSS-REFERENCE TO RELATED APPLICATIONS

Pursuant to 35 U.S.C. § 119(e), this application claims the benefit of earlier filing date and right of priority to U.S. Provisional Application No. 60/561,943, filed on Apr. 12, 2004, the contents of which is hereby incorporated by reference herein in its entirety.

BACKGROUND OF THE INVENTION

1. Field of the Invention

The present invention relates to a mobile communication system, and more particularly, to a temporary service identifier (TSI) for identifying a specific point-to-multipoint service among a plurality of point-to-multipoint services being transmitted through a specific transport channel.

2. Description of the Related Art

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a terminal (or user equipment: UE), a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200.

The Node-Bs 112, 113 receive information sent by the physical layer of the terminal through an uplink, and transmit data to the terminal through a downlink. The Node-Bs 112, 113, thus, operate as access points of the UTRAN 100 for the terminal.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as "Iu-PS," and the Iu interface between the RNCs 111 and the core network 200 for circuit switched systems is defined as "Iu-CS."

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast channel (BCCH) and a paging control channel (PCCH) or a Shared Channel Control Channel (SHCCH). The BCCH provides information including information utilized by a terminal to access a system. The PCCH is used by the UTRAN to access a terminal.

For the purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data. Additionally, an MSCH (MBMS point-to-multipoint Scheduling Channel) is four transmitting scheduling information.

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed. The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

The MAC-c/sh sub-layer manages a common transport channel, such as a forward access channel (FACH) or a downlink shared channel (DSCH), which is shared by a plurality of terminals. In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sublayer exists in each terminal (UE).

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a 'CB message', hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol (such as an IPv4 or IPv6) to be effectively transmitted on a radio interface with a relatively small bandwidth. To achieve this, the PDCP layer performs the function of reducing unnecessary control information used for a wired network, and this type of function is called, header compression.

There is a radio resource control (RRC) layer at a lowermost portion of the L3 layer. The RRC layer is defined only in the control plane, and handles the controlling of logical channels, transport channels, and physical channels with respect to setting, resetting, and releasing of radio bearers. The radio bearer service refers to a service that the second layer (L2) provides for data transmission between the terminal and the UTRAN, and in general, setting the radio bearer refers to defining the protocol layers and the channel characteristics of the channels required for providing a specific service, as well as respectively setting substantial parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The MAC header will now be described in greater detail. FIG. 3 shows a structure of a MAC layer for the UTRAN. FIGS. 4 to 7 show structures of the MAC-d and MAC-c/sh sublayer of the UTRAN, in which the square blocks show each function of the MAC layer. The primary functions thereof will now be described.

The MAC layer exists between the RLC and physical layers and its major function is to map the logical channels and transport channels to each other. The MAC layer needs such channel mapping because a channel handling method of a higher layer of the MAC layer is different from that of a lower layer of the MAC layer. Namely, in the higher layer of the MAC layer, channels are divided into control channels of the control plane and traffic channels of the user plane according to the content of data transferred on the channel. However, in the lower layer of the MAC layer, channels are divided into common channels and dedicated channels according to how the channels are shared. Therefore, channel mapping between the higher and lower layers of the MAC layer is very significant. The relationship of channel mapping is shown in FIG. 4, which illustrates a diagram of the channel mapping in a UE.

Another major function of the MAC layer is logical channel multiplexing. The MAC layer multiplexes several logical channels into one transport channel, so that a multiplexing gain is attained. Multiplexing gain is significant for intermittently transmitted traffic, such as signaling information or packet data. For circuit data, multiplexing is generally not used because data is continuously transferred, and as a result, the multiplexing gain is relatively not so high.

The channel mapping and logical channel multiplexing functions of the MAC layer are advantageous in increasing both the flexibility of channel selection and the efficiency of channel resources, but to support these advantages, certain kinds of identification functions are required.

Identification is classified into two types: UE identification and logical channel identification. First, UE identification is needed for a common transport channel, since it is shared by a plurality of UEs. Second, logical channel identification is needed when several logical channel are multiplexed into one transport channel. For identification purposes, the MAC layer inserts a TCTF (target channel type field), UE-Id Type, UE-Id and/or C/T (Control/Traffic) fields into the header of a MAC PDU.

In more detail, UE identification is required when a dedicated logical channel such as DCCH or DTCH is mapped to a common transport channel such as CPCH, DSCH, or USCH. To achieve this, the MAC layer adds a RNTI (radio network temporary identity) to the UE-ID field of the MAC PDU header. Currently, three kinds of RNTI such as U-RNTI (UTRAN RNTI), C-RNTI (cell RNTI), and DSCH-RNTI are used to identify a specific UE. Since there are three kinds of RNTI that are used, a UE-ID type field informing which RNTI is used is also added to the MAC PDU header.

For logical channel identification, two levels of logical channel identification are applied. The first level is logical channel type identification provided by the TCTF (target channel type field), and the second level is dedicated logical channel identification provided by the C/T (Control/Traffic) field.

The TCTF is required for a common transport channel like the FACH and RACH on which several types of logical channels are multiplexed. For example, the BCCH, CCCH, CTCH, and one or more dedicated logical channels (DCCH or DTCH) can be mapped on the FACH simultaneously, and the CCCH and one or more dedicated logical channels can be mapped on RACH simultaneously. Therefore, the TCTF provides logical channel type identification on the FACH and RACH, i.e., whether the received data on the FACH or RACH belongs to the BCCH, CCCH, CTCH, or one of the dedicated logical channels.

Although the TCTF identifies the type of logical channel, it does not identify each of the logical channels. The TCTF is required for the transport channel when a dedicated logical channel can be mapped together with other logical channels. Thus, the TCTF identifies whether the logical channel is a dedicated logical channel or other logical channel. However, for common logical channels, since only one common logical channel of the same type can be mapped on a single transport channel, the TCTF also provides logical channel identification in the case of common logical channels.

On the contrary, more than one dedicated logical channel can be mapped to the FACH or RACH at the same time. In other words, several DCCHs or DTCHs can be mapped to the FACH or RACH. Therefore, for dedicated logical channels, identification of each dedicated logical channel is needed in addition to the identification of the type of logical channel. The C/T field serves this purpose.

Identification of each dedicated logical channel is performed by using the C/T field for the following reasons. First, unlike common logical channels, a plurality of dedicated logical channels can be mapped to one transport channel at the same time. Second, a dedicated logical channel is handled by the MAC-d in the SRNC, whereas the other common logical channels are handled by the MAC-c/sh. A plurality of the dedicated logical channels that are mapped to the same transport channel have their logical channel identities, respectively. Additionally, such value is used as a C/T field value. If only one dedicated logical channel exists for the transport channel, the C/T field is not used.

Table 1 below shows the different identifiers of a MAC header that are used according to the mapping relationship between logical channels and transport channels for FDD. In Table 1, a C/T field exists when several dedicated logical channels (DCCH or DTCH) are mapped. Also, "N" indicates that there is no header, "-" indicates that there is no mapping relationship, and "UE-ID" indicates that both a UE-ID field and a UE-ID type field exist. A UE-ID field always exists together with a UE-ID type field.

TABLE 1

|  | DCH | RACH | FACH | DSCH | CPCH | BCH | PCH |
| --- | --- | --- | --- | --- | --- | --- | --- |
| DCCH or DTCH | C/T | TCTF UE-ID C/T | TCTF UE-ID C/T | UE-ID C/T | UE-ID C/T | — | — |
| BCCH | — | — | TCTF | — | — | N | — |
| PCCH | — | — | — | — | — | — | N |
| CCCH | — | TCTF | TCTF | — | — | — | — |
| CTCH | — | — | TCTF | — | — | — | — |

As shown in the above table, in the related art, common type of logical channels like the BCCH, PCCH, CCCH, and CTCH do not have a C/T field to identify each logical channel. This is because, in the related art, there is no need to multiplex several common logical channels of the same type into a single transport channel. The reason is that since the same information is transmitted on the common logical channels of the same type, the receiving end (Receiver) does not have to receive more than one common logical channel of the same type at the same time. Therefore, a single common transport channel like the FACH or RACH always carries only one common logical channel of the same type, and there is no need to add a C/T field for the common logical channels in the related art.

Recently, a new type of service called MBMS (Multimedia Broadcast/Multicast Service) has been proposed. MBMS is a PS (Packet Switched) domain service of transferring multimedia data such as audio, pictures, video, etc. to a plurality of terminals using a unidirectional point-to-multipoint bearer service. When the UMTS network 1 provides a specific MBMS using a multicast mode, UEs to be provided with the service must first complete a subscription procedure establishing a relationship between a service provider and each UE individually. Thereafter, the subscriber UE receives a service announcement from the core network 200 confirming subscription and including, for example, a list of services to be provided.

Since MBMS data is shared by multiple users, it should be transmitted through a common logical channel as in the related art. However, since MBMS is a multimedia service, multiple services of different QoS or multiple streams of different QoS in the same service may be provided to a single UE or to different UEs. That is, it is expected that multiple common logical channels of the same type need to be mapped to the same transport channel when providing MBMS.

In the related art, however, multiple common logical channels of the same type are typically not mapped to the same transport channel. One problem is that there is no common logical channel identifier in the MAC header. Another problem is that there is no identification function in the MAC-c/sh. Therefore, a new functionality of common logical channel identification should be considered when MBMS or other type of packet switched (PS) domain service is to be provided.

Moreover, in MBMS, there is a one-to-one mapping relationship between an MBMS service and a common logical channel such as an MTCH (MBMS Traffic Channel). Thus, because multiple common logical channels of the same type are to be mapped to the same transport channel when providing MBMS, as stated above, multiple MBMS services may be transmitted through the same transport channel. Consequently, a mobile terminal can simultaneously receive different services transmitted through the same transport channel.

The different MBMS services are globally identified by an MBMS service identifier. However, there potentially exist thousands of different services. If the MBMS service identifier is used, then a MAC header, including the MBMS service identifier, for allowing the mobile terminal to distinguish the different services would be very big in size and a large overhead would exist during transmission. Therefore, a method for identifying the different services while keeping the MAC header small in size is needed.

SUMMARY OF THE INVENTION

The present invention is related to a temporary service identifier (TSI) for identifying a point-to-multipoint service among a plurality of point-to-multipoint services being transmitted through a specific transport channel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is preferably embodied in a method for identifying a point-to-multipoint service among a plurality of point-to-multipoint services being transmitted through a transport channel in a wireless communication system, the method comprising allocating to each of the plurality of point-to-multipoint services a point-to-multipoint service identifier identifying the point-to-multipoint service, generating mapping information for indicating the allocation of the point-to-multipoint service identifiers to each of the plurality of point-to-multipoint services, transmitting the mapping information to a mobile terminal, providing a medium access control layer for generating at least one protocol data unit associated with at least one of the plurality of point-to-multipoint services, generating the at least one protocol data unit in the medium access control layer, attaching to the at least one protocol data unit the point-to-multipoint service identifier allocated to the at least one of the plurality of point-to-multipoint services according to the mapping information, and transmitting the at least one protocol data unit including the allocated point-to-multipoint service identifier through the transport channel to the mobile terminal.

In one aspect of the invention, allocation of the point-to-multipoint service identifiers is handled by a radio resource control layer of a network. The mapping information is generated in a radio resource control layer of a network.

In a more detailed aspect of the invention, the radio resource control layer of the network transfers the mapping information to the medium access control layer of the network. Also, the radio resource control layer of the network transmits the mapping information to a radio resource control layer of the mobile terminal. Preferably, the radio resource control layer of the mobile terminal transfers the mapping information to a medium access control layer of the mobile terminal.

In a further aspect of the invention, the transport channel is a FACH. The protocol data unit is transmitted through a common logical channel MTCH.

Preferably, the method further comprises transferring values for the point-to-multipoint service identifiers respectively allocated to each of the point-to-multipoint services to the medium access control layer of a network and transmitting the values for the point-to-multipoint service identifiers to a radio resource control layer of the mobile terminal. Moreover, the radio resource control layer of the mobile terminal transfers the values for the point-to-multipoint service identifiers to a medium access control layer of the mobile terminal.

In another aspect of the invention, the point-to-multipoint service identifier has a length of 4 bits and a maximum of 16 point-to-multipoint services are transmitted through the transport channel. Preferably, the point-to-multipoint service identifier is attached to a header of the at least one protocol data unit.

In accordance with another embodiment of the present invention, a method for identifying a point-to-multipoint service among a plurality of point-to-multipoint services being received through a transport channel by a mobile terminal in a wireless communication system, comprises receiving from a network mapping information for indicating an allocation of a point-to-multipoint service identifier to each of the plurality of point-to-multipoint services, receiving in a medium access control layer at least one protocol data unit associated with at least one of the plurality of point-to-multipoint services, wherein a point-to-multipoint service identifier allocated to the at least one of the plurality of point-to-multipoint services is attached to the at least one protocol data unit, and determining to process the at least one protocol data unit by evaluating the allocated point-to-multipoint service identifier with the mapping information.

In one aspect of the invention, the allocation of the point-to-multipoint service identifiers is handled by a radio resource control layer of the network. The mapping information is generated in a radio resource control layer of the network.

In a more detailed aspect, a radio resource control layer of the mobile terminal receives the mapping information from the radio resource control layer of the network. Preferably, the radio resource control layer of the mobile terminal transfers the mapping information to a medium access control layer of the mobile terminal.

In another aspect of the invention, the transport channel is a FACH.

Preferably, the method further comprises receiving values for the point-to-multipoint service identifiers respectively allocated to each of the point-to-multipoint services, wherein the values for the point-to-multipoint service identifiers are generated in a radio resource control layer of the network and transmitted to a radio resource control layer of the mobile terminal. Moreover, the radio resource control layer of the mobile terminal transfers the values for the point-to-multipoint service identifiers to a medium access control layer of the mobile terminal.

In another aspect of the invention, the point-to-multipoint service identifier has a length of 4 bits and a maximum of 16 point-to-multipoint services are received through the transport channel. Also, the point-to-multipoint service identifier is attached to a header of the at least one protocol data unit.

In accordance with one embodiment of the present invention, the determining step comprises reading the allocated point-to-multipoint service identifier and determining a matching point-to-multipoint service corresponding to the allocated point-to-multipoint service identifier by reading the mapping information, wherein if the matching point-to-multipoint service is a service that the mobile terminal wishes to receive, the at least one protocol data unit is processed, wherein if the matching point-to-multipoint service is a service that the mobile terminal does not wish to receive, the at least one protocol data unit is disregarded.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 9A and FIG. 9B are diagrams of a MAC PDU format in accordance with one embodiment of the present invention.

FIG. 13 is a diagram of a data transmission in accordance with one embodiment of the present invention.

DETAILED DESCRIPTION OF THE PREFERRED EMBODIMENTS

Reference will now be made in detail to the preferred embodiments of the present invention, examples of which are illustrated in the accompanying drawings.

The present invention is related to a temporary service identifier (TSI) for identifying a specific MBMS service among a plurality of MBMS services being transmitted through a specific transport channel. The present invention is accomplished by inserting a TSI field in a header of a medium access control (MAC) layer data unit corresponding to the MBMS service and transmitting the data unit to a mobile terminal through the specific transport channel. The mobile terminal determines to receive the data unit according to mapping information received from a UTRAN, wherein the mapping information informs the mobile terminal of which MBMS service a TSI field value is allocated to.

FIGS. 9A and 9B illustrate a MAC PDU format in accordance with one embodiment of the present invention, in which the MAC PDU format is used when data of a common logical channel, such as an MTCH, is transferred through a common transport channel, such as a FACH. It is also shown that a TCTF and a TSI field comprise a header of the MAC PDU while a MAC SDU comprises a payload of the MAC PDU.

Referring to FIGS. 9A and 9B, there are preferably two types of MAC PDU formats. In the first type, the MAC PDU header comprises TCTF and TSI fields, as shown in FIG. 9A. This type of MAC PDU is used when the transport channel, such a FACH, carries different types of logical channels. Here, the TCTF field identifies the type of logical channel, and the TSI field identifies an MBMS service being transmitted on the logical channel.

In the second type, the MAC PDU header comprises a TSI field for identifying an MBMS service being transmitted on the logical channel, as shown in FIG. 9B. Accordingly, a TCTF field is not included. This type of MAC PDU is used when the transport channel can carry only one type of common logical channel. Here, the TSI field is included in the header as in the first type, but the TCTF field is not needed because the transport channel itself identifies the type of logical channel.

Therefore, a TCTF field is present in the MAC PDU header when the transport channel can carry more than one type of logical channel. Moreover, a TSI field is present in the MAC PDU header when more than one MBMS service is multiplexed to the transport channel.

Figure 1:
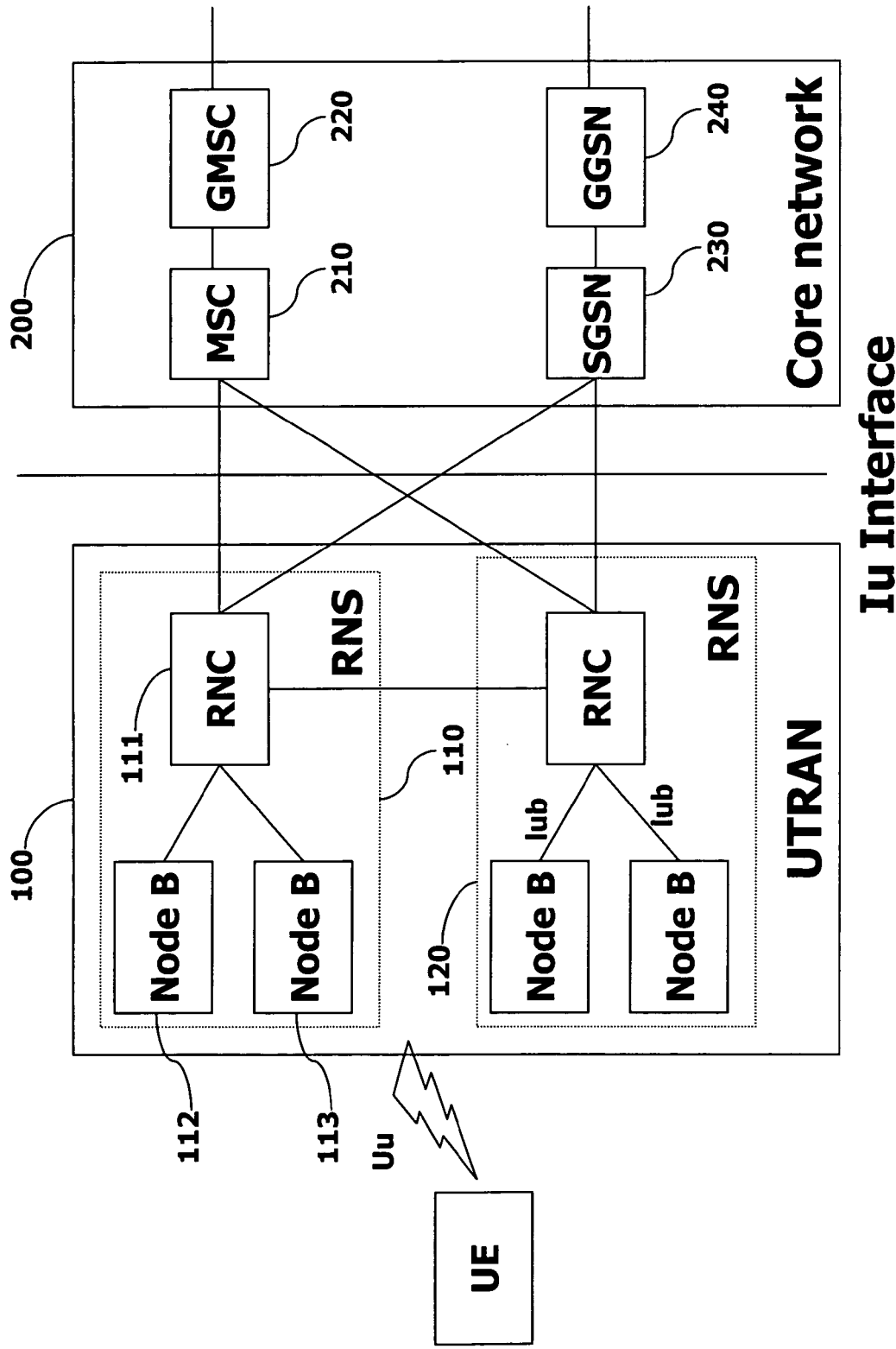
FIG. 1 is a block diagram of a general UMTS network architecture.
Figure 2:
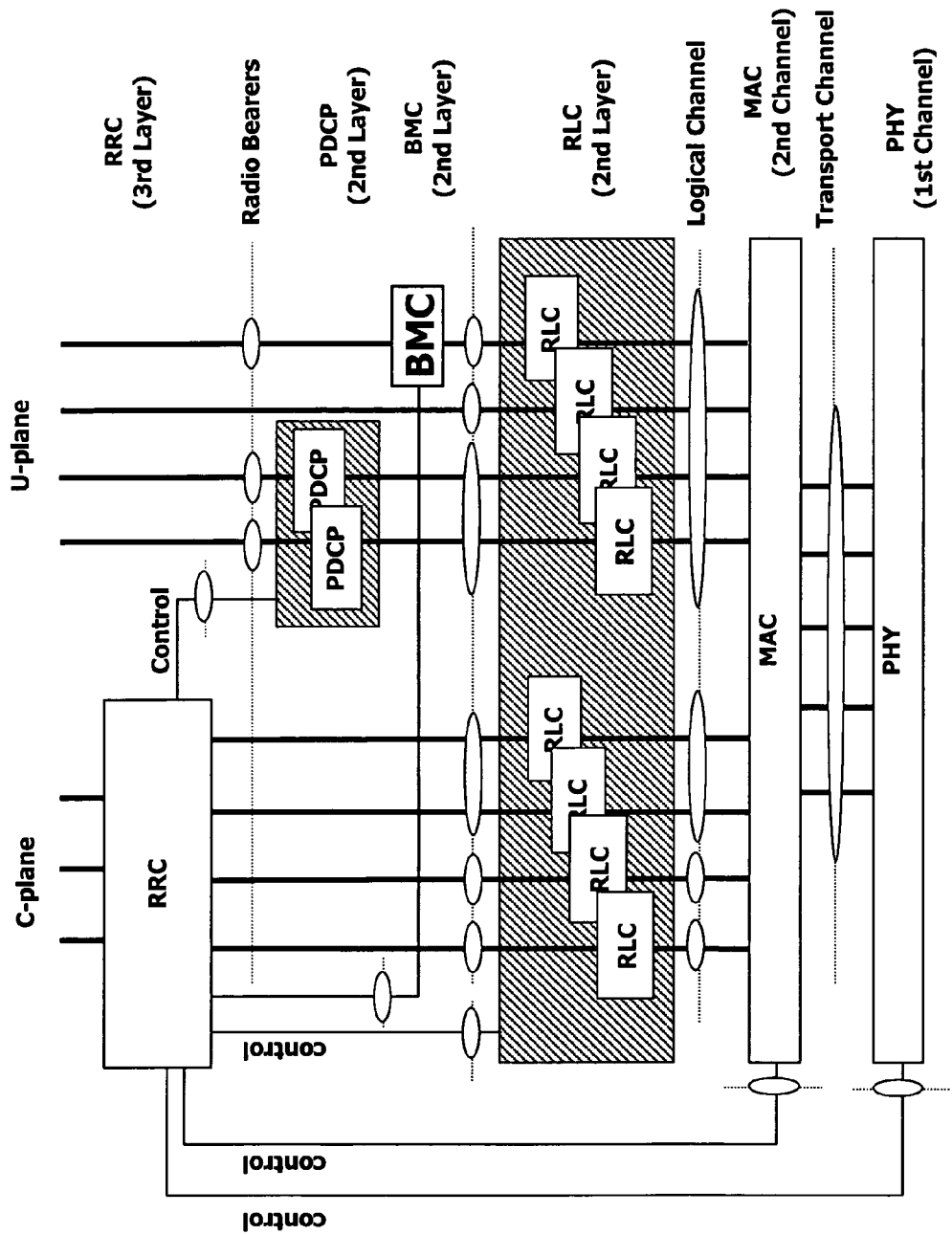
FIG. 2 is a block diagram of a structure of a radio interface protocol between a terminal and a UTRAN based on 3GPP radio access network standards.
Figure 3:
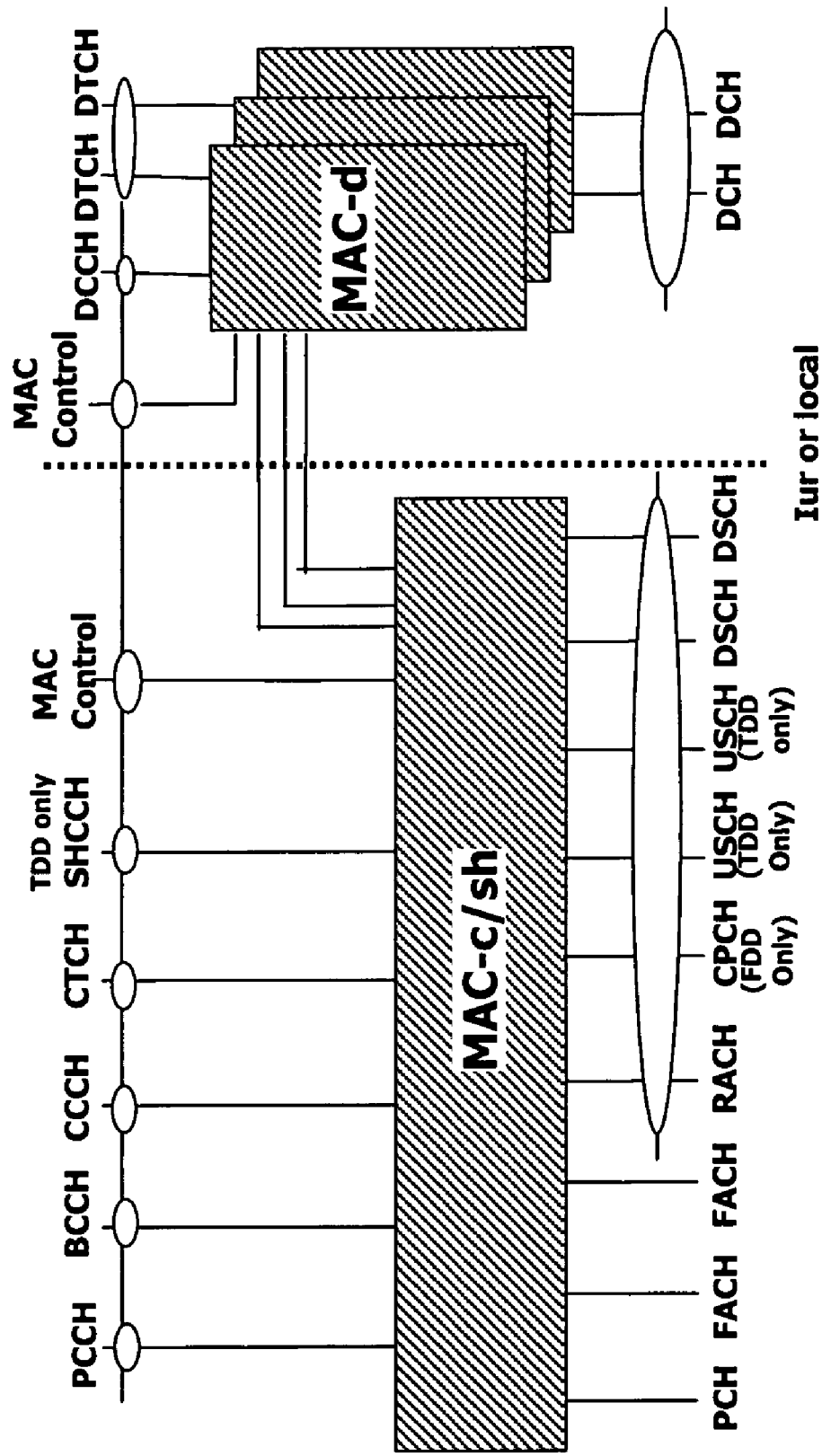
FIG. 3 is a block diagram of a general architecture of a MAC layer of the UTRAN.
Figure 4:
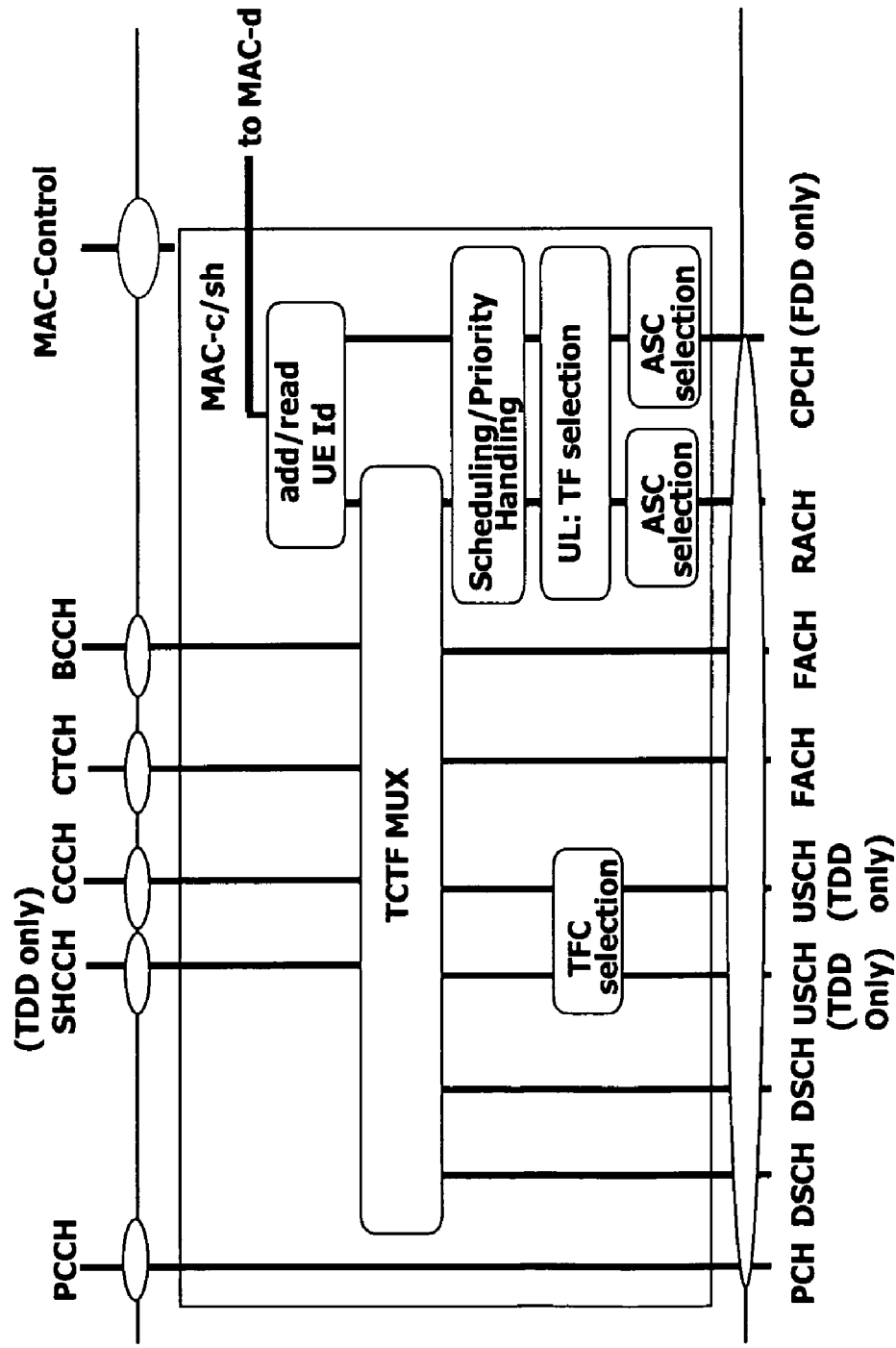
FIG. 4 is a diagram of a general architecture of a MAC-c/sh of the mobile terminal.
Figure 5:
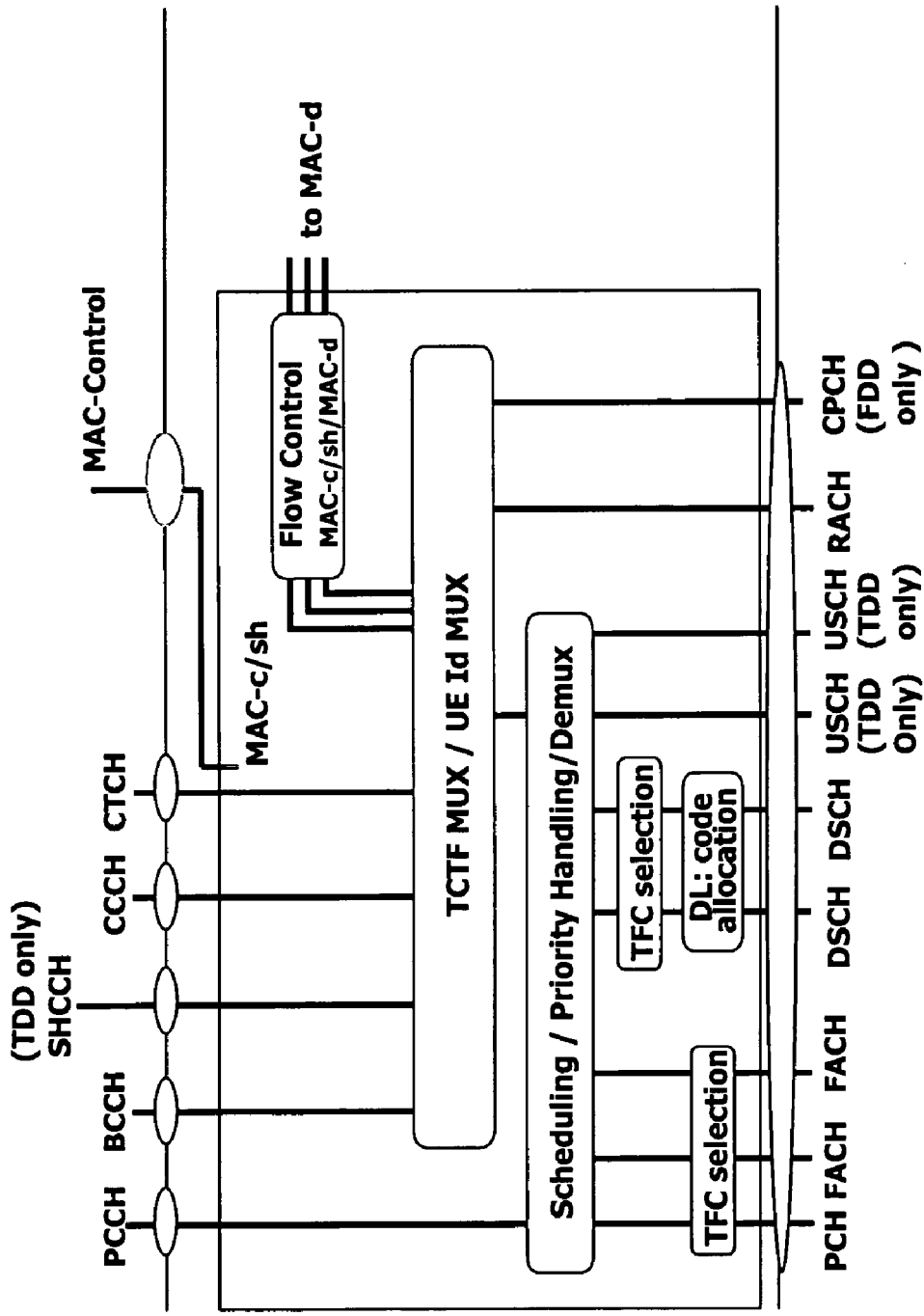
FIG. 5 is a diagram of a general architecture of a MAC-c/sh of the UTRAN.
Figure 6:
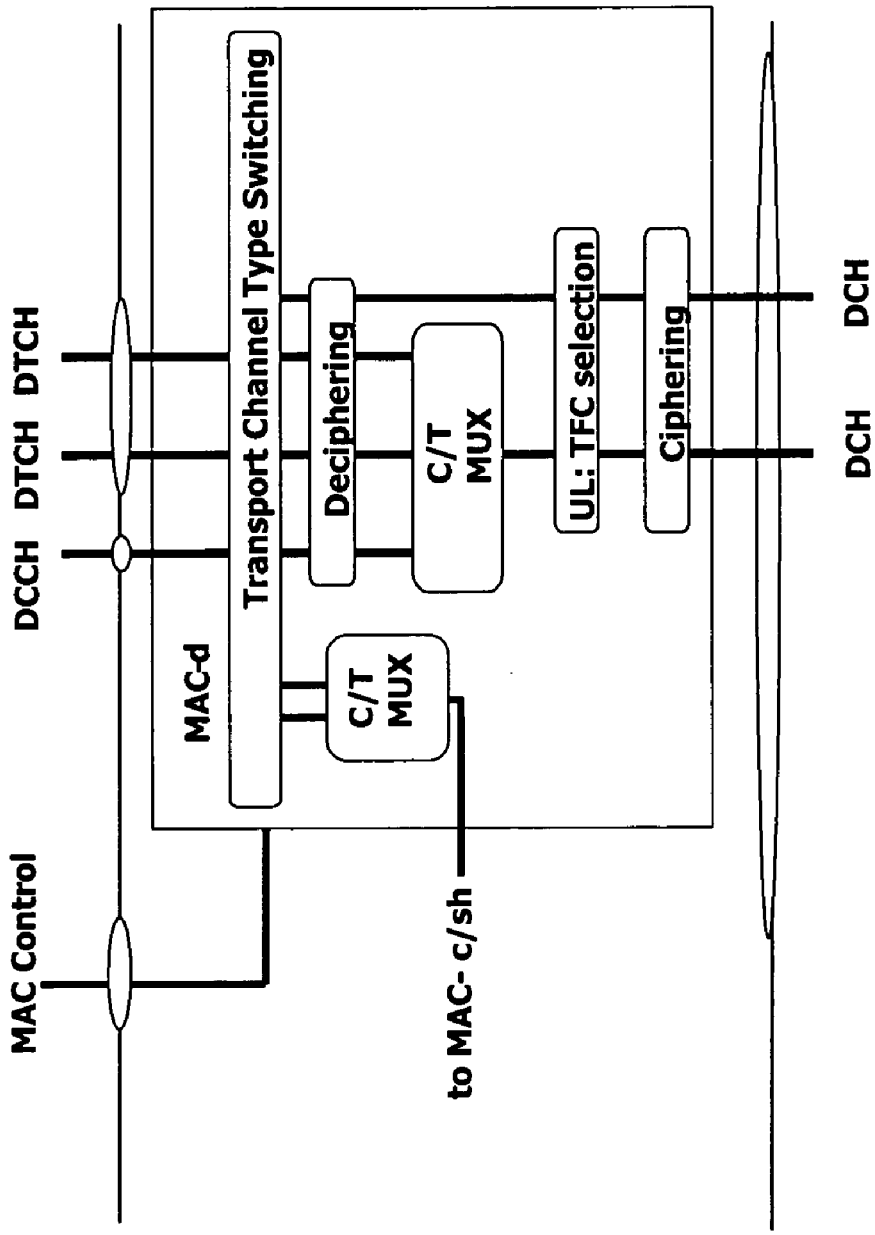
FIG. 6 is a diagram of a general architecture of a MAC-d of the mobile terminal.
Figure 7:
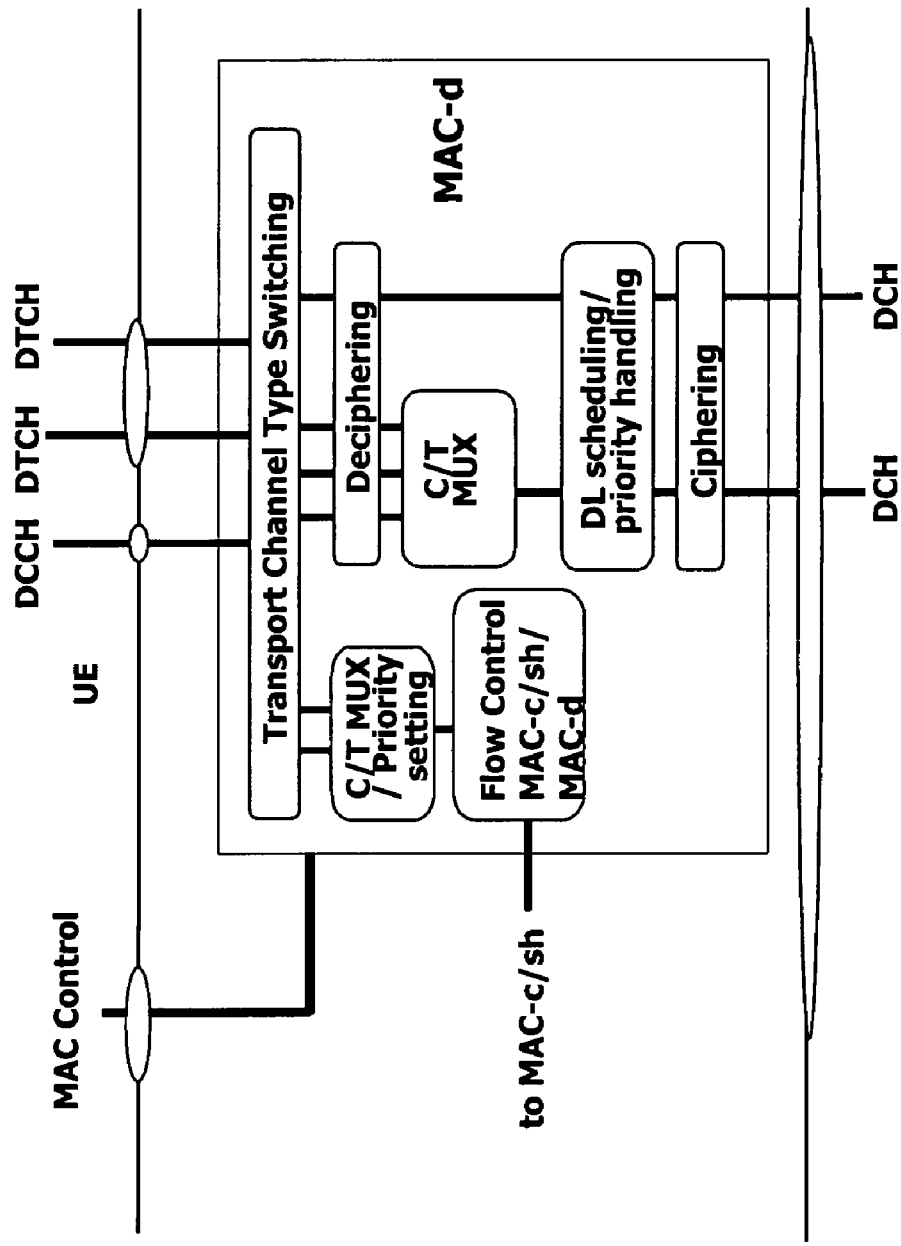
FIG. 7 is a diagram of a general architecture of a MAC-d of the UTRAN.
Figure 8:
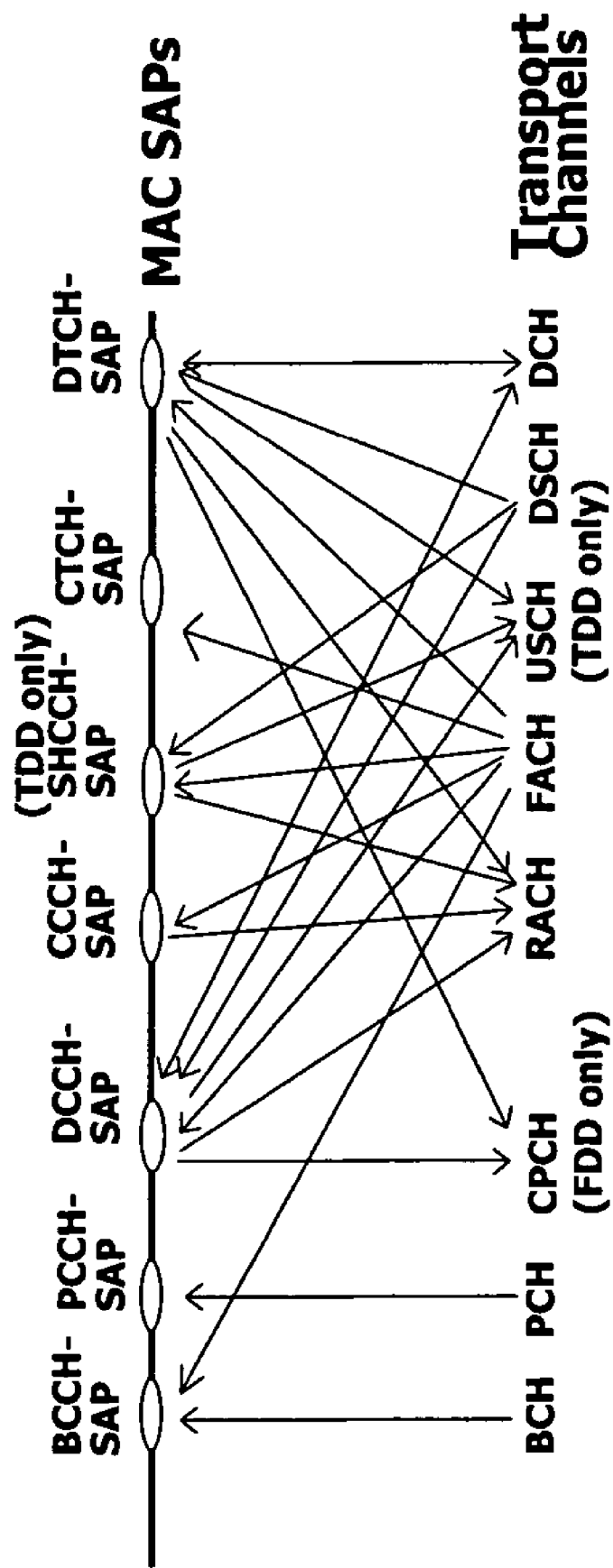
FIG. 8 is a diagram of a mapping relationship (at the UE side) between logical and transport channels.
Figure 10:
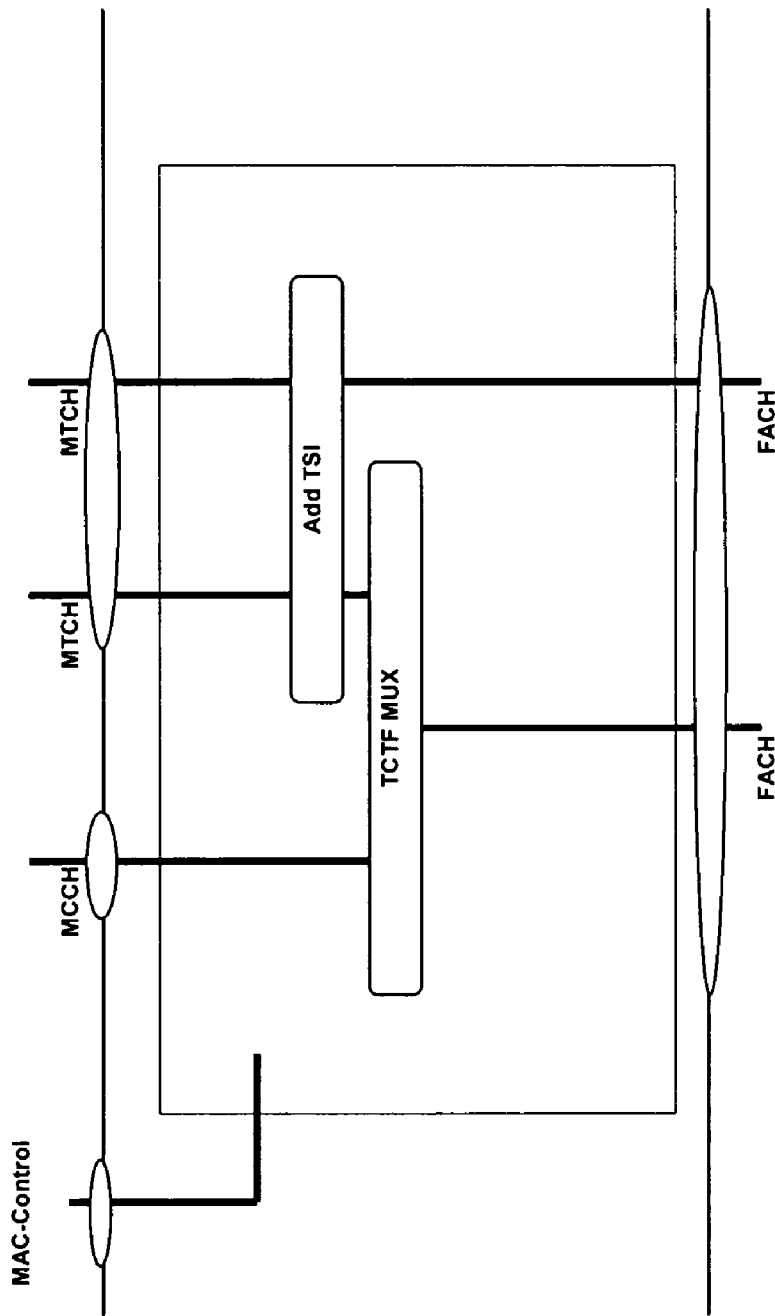
FIG. 10 is a diagram of an architecture of a MAC of the UTRAN in accordance with one embodiment of the present invention.
Figure 11:
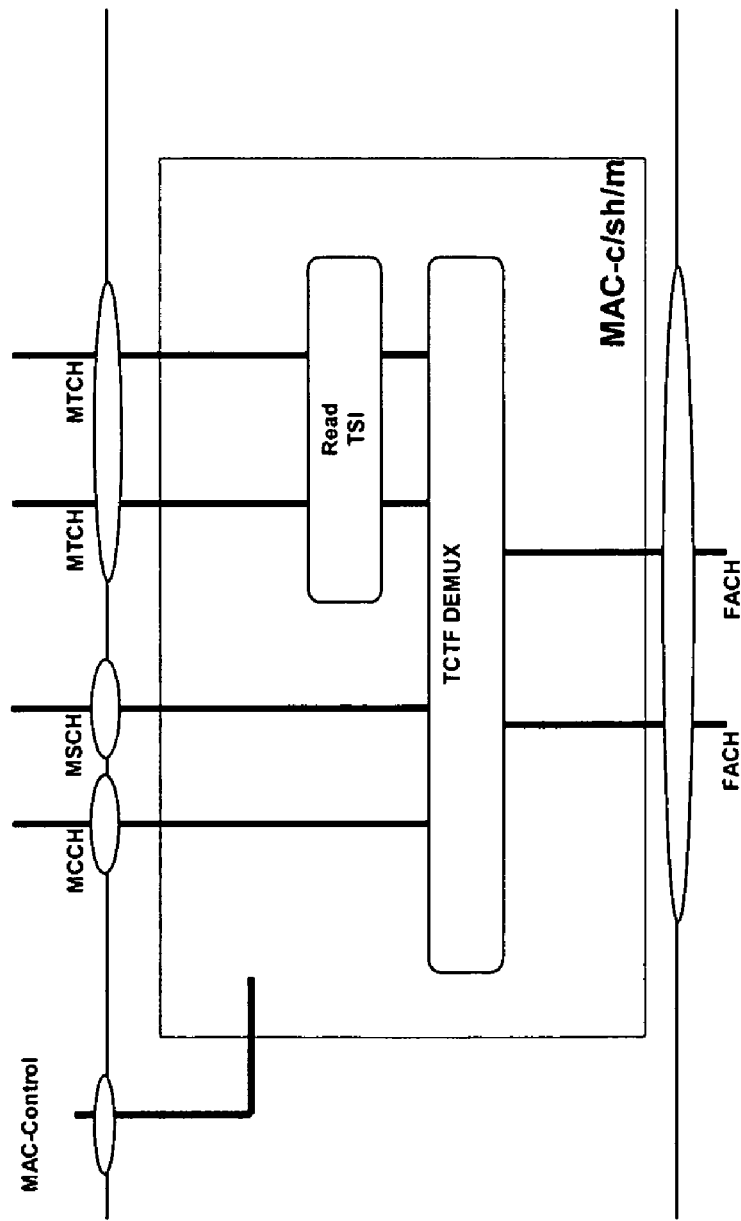
FIG. 11 is a diagram of an architecture of a MAC of the mobile terminal in accordance with one embodiment of the present invention.

FIG. 10 illustrates an architecture of a MAC of the UTRAN in accordance with one embodiment of the present invention. FIG. 11 illustrates an architecture of the MAC of the mobile terminal in accordance with one embodiment of the present invention.

Referring to FIGS. 10 and 11, when common logical channels such as the MTCH are multiplexed, the MAC performs a TSI multiplexing (MUX) function. Preferably, when the MTCHs are multiplexed to one transport channel, the MAC performs the TSI MUX function. The TSI MUX function of the MAC in the UTRAN inserts a TSI field for identifying an MBMS service in a header of the corresponding MAC PDU. The TSI MUX function of the MAC in the mobile terminal removes the TSI field from the MAC PDU after reading TSI field information identifying the MBMS service from the header of the received MAC PDU.

Figure 12:
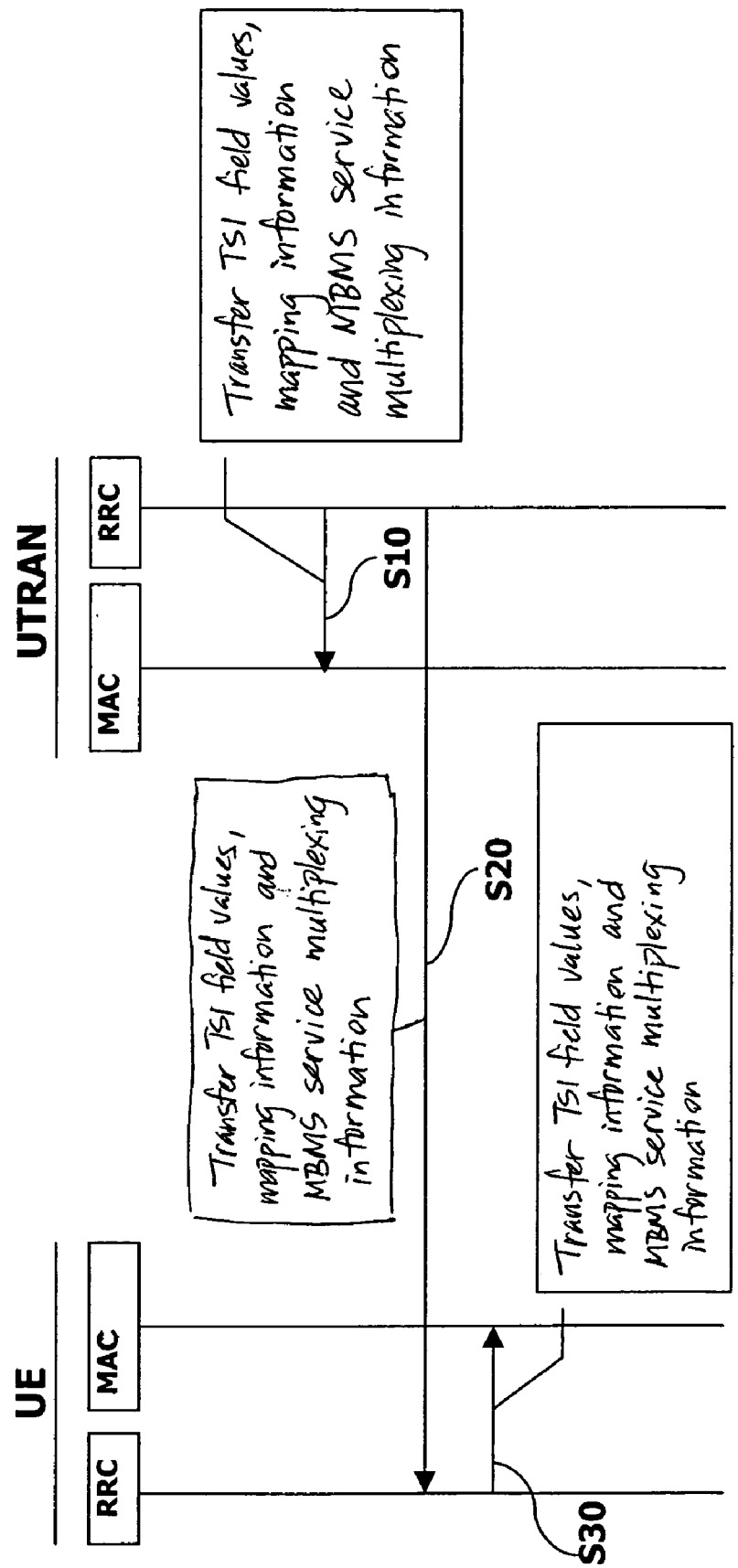
FIG. 12 is a diagram of the allocation of TSI (Temporary Service Identifier) field values in accordance with one embodiment of the present invention.

FIG. 12 is a diagram illustrating the allocation of TSI field values according to one embodiment of the present invention. An RRC layer of a UTRAN manages the grouping of several MBMS services for multiplexing to one transport channel, such as a FACH, and allocates a TSI field value to each MBMS service. The time during which the TSI is allocated may be given explicitly, or implicitly. For example, the allocation may be valid until the mobile terminal changes cells, or until the allocation changes. Moreover, the TSI is preferably transmitted periodically during the lifetime of an active MBMS service. In MBMS, there is a one-to-one relationship between an MBMS service and a common logical channel, such as an MTCH. Thus, the RRC layer of the UTRAN also manages the grouping of several common logical channels carrying a respective MBMS service for multiplexing to one transport channel. Furthermore, the RRC layer of the UTRAN generates mapping information for indicating which TSI field values are allocated to which MBMS services.

The TSI field may be small in size. As such, the TSI allows to distinguish few services. However, given that very few services are actively transmitted at the same time under normal circumstances, a TSI having a small size, such as 4 bits, would be preferable in order to keep overhead low. Furthermore, supposing that a transport block has a size of 336 bits, and the number of possible services is limited to 4000 services, this would imply that a prior art identification field would require a size of 12 bits. This translates into an overhead of 3.5%. However, in the present invention, if the TSI field having a size of 4 bits, for example, were used to identify a maximum of 16 services, the overhead would be reduced to 1.2%.

Referring to FIG. 12, a method for allocating TSI field values will be explained. After the RRC layer of the UTRAN allocates the TSI field values to their respective MBMS services and generates the mapping information, the RRC layer transfers to a medium access control (MAC) layer of the UTRAN, the TSI field values, the mapping information and MBMS service multiplexing information related to multiplexing a plurality of MBMS services to a specific transport channel (S10).

The RRC layer of the UTRAN also transfers the TSI field values, the mapping information and the MBMS service multiplexing information to an RRC layer of a mobile terminal or UE (S20). The information may be sent either once or periodically. Preferably, the TSI field values, the mapping information and the MBMS service multiplexing information are transferred to the RRC layers of all mobile terminals that are meant to receive the specific transport channel. The RRC layer of the mobile terminal having received the TSI field values, the mapping information and the MBMS service multiplexing information, transfers the received information to a MAC layer of the mobile terminal (S30).

FIG. 13 is a diagram of a data transmission according to one embodiment of the present invention. Here, the plurality of MBMS services are multiplexed to one common transport channel, such as a FACH. Moreover, each MBMS service is transmitted on a respective common logical channel, such as an MTCH.

Referring to FIG. 13, a method for transmitting a plurality of MBMS services through a specific transport channel will be explained. The method comprises multiplexing data units of a plurality of MBMS services to a specific transport channel, transmitting the multiplexed data units to a mobile terminal, and de-multiplexing the transmitted data units in the mobile terminal. The multiplexing step comprises multiplexing data received via a plurality of common logical channels, attaching a TSI field to a header of the received data to generate a protocol data unit (PDU), and transmitting the generated PDU through the specific transport channel.

The de-multiplexing step comprises receiving data units through the specific transport channel, checking the TSI field of the received data, determining to de-multiplex the received data according to the mapping information, and transmitting the data determined to be received to a higher layer in the mobile terminal through the common logical channel designated by the TSI.

Further referring to FIG. 13, although two MBMS services are shown to be transmitted through the same transport channel, preferably a maximum of 16 services can be transmitted through the same transport channel in accordance with one embodiment of the present invention. Also, it is preferable that common logical channels MTCH #1 and MTCH #2 carrying MBMS #1 and MBMS #2, respectively, are multiplexed to one common transport channel FACH. It is further preferable that the peer of RLC entity #1 at the UTRAN is RLC entity #1 at the mobile terminal or UE, and the peer of RLC entity #2 at the UTRAN is RLC entity #2 at the mobile terminal.

A method for transmitting a plurality of MBMS services through a specific transport channel is as follows. First, the RLC entity #1 of the UTRAN generates a MAC SDU #1 for a service MBMS #1 and transfers the MAC SDU #1 to a MAC layer of the UTRAN through the MTCH #1 (S110). Meanwhile, the RLC entity #2 of the UTRAN generates a MAC SDU #2 for a service MBMS #2 and transfers the MAC SDU #2 to the MAC layer of the UTRAN through the MTCH #2 (S120).

The MAC layer of the UTRAN then multiplexes MTCH #1 and MTCH #2, and attaches a MAC header including a TSI field to MAC SDU #1 to construct MAC PDU #1 (S130). Here, a TSI field value included in the header of MAC PDU #1 may indicate the common logical channel MTCH #1 as well as identify that MAC PDU #1 is related to MBMS #1. As stated above, TSI field values along with mapping information are received in the MAC layer from the RRC layer of the UTRAN. Thus, as a MAC SDU is received in the MAC layer, the MAC layer knows which TSI field value is to be mapped with which MBMS service according to the mapping information. Here, as MAC SDU #1 corresponding to MBMS #1 is received, the MAC layer in accordance with the mapping information attaches a header having a TSI field value corresponding to MBMS #1 to construct MAC PDU #1.

With the same scheme, a MAC header including a TSI field is attached to MAC SDU #2 to construct MAC PDU #2 (S130). ATSI field value included in the header of MAC PDU #2 may indicate the common logical channel MTCH #2 as well as identify that MAC PDU #2 is related to MBMS #2. Moreover, because of the mapping information received in the MAC layer from the RRC layer of the UTRAN, the MAC layer is aware of the mapping relationship between the received TSI field values and any MBMS services. Thus, as MAC SDU #2 corresponding to MBMS #2 is received in the MAC layer, the MAC layer in accordance with the mapping information attaches a header having a TSI field value corresponding to MBMS #2 to construct MAC PDU #2.

The MAC layer of the UTRAN transfers MAC PDU #1 and MAC PDU #2 to a physical layer of the UTRAN through the same transport channel FACH (S140). The MAC PDU #1 and MAC PDU #2 are then transmitted to a physical layer of the mobile terminal through an air interface. The physical layer of the mobile terminal transfers the received MAC PDU #1 and MAC PDU #2 to a MAC layer of the mobile terminal through a same transport channel FACH of the mobile terminal.

After receiving the MAC PDU #1 and the MAC PDU #2, the MAC layer of the mobile terminal checks the TSI fields included in the received MAC PDUs and determines to receive the MAC PDUs accordingly (S150). Preferably, the MAC layer detects the TSI field values from the headers of the MAC PDUs, and determines whether the received MAC PDUs are related to MBMS services the mobile terminal has subscribed to. If the MAC PDU is related to an MBMS service subscribed to by the mobile terminal, the mobile terminal continues receiving the MAC PDU. If the MAC PDU is not related to an MBMS service subscribed to the by the mobile terminal, the mobile terminal disregards the MAC PDU.

Using the mapping information received from the RRC layer of the mobile terminal, which was received from the RRC layer of the UTRAN, as stated above, the MAC layer of the mobile terminal determines whether the MAC PDU is related to a subscribed MBMS service. Specifically, the MAC layer of the mobile terminal matches the received TSI field value with a corresponding MBMS service according to the mapping information. If the corresponding MBMS service is a service that the mobile terminal has subscribed to, then the mobile terminal extracts the MAC SDU and forwards it to higher layers. However, if the corresponding MBMS service is a service that the mobile terminal has not subscribed to, then the mobile terminal disregards the MAC PDU.

Preferably, if it is determined that the MAC PDU is to be received, the MAC layer of the mobile terminal also checks the TSI field for information regarding a common logical channel the MAC PDU is to be transferred through. Here, if the MAC PDU#1 and the MAC PDU#2 are determined to be received, the MAC layer of the mobile terminal checks the MAC PDUs' respective TSI fields to determine whether processing of the received MAC PDUs should be performed (S150).

Hence, if a detected TSI field indicates a common logical channel MTCH#1, a corresponding MAC SDU #1 is transferred to RLC entity #1 of the mobile terminal through MTCH #1 (S160). Here, if reception is correct, then the mobile terminal confirms that the MAC SDU corresponding to MTCH #1 is the MAC SDU #1. Likewise, if a detected TSI field indicates a common logical channel MTCH #2, a corresponding MAC SDU #2 is transferred to RLC entity #2 of the mobile terminal through MTCH #2 (S170). Here, if reception is correct, then the mobile terminal confirms that the MAC SDU corresponding to MTCH #2 is the MAC SDU #2.

Accordingly, in the present invention, the MAC layer of the UTRAN and the mobile terminal respectively perform multiplexing and de-multiplexing functions for a plurality of MBMS services transmitted through respective common logical channels. A TSI field value is used to identify each of the MBMS services such that multiplexing of the plurality of MBMS services to the same transport channel becomes possible. Consequently, overhead is reduced because the use of a global MBMS identifier, having a large overhead, is unnecessary. Moreover, multiple services of different QoS or multiple streams of different QoS in the same service can be provided to a single mobile terminal, which is an essential feature for next generation mobile communication systems. As such, the motivation to apply the teachings and suggestions of the present invention to various types of radio (wireless) communication schemes would be clearly understood by those having ordinary skill in the art.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of data transmission in a mobile communication system based on a radio interface protocol having a radio resource control (RRC) layer and a medium access control (MAC) layer, the method comprising:

mapping a plurality of common logical channels of same channel type to a common transport channel, wherein the plurality of common channels of same channel type are located above the MAC layer and the common transport channel is located below the MAC layer;

allocating at least one logical channel identifier to at least one data unit of the common logical channels; and transferring the at least one data unit having the at least one logical channel identifier allocated thereto through the common transport channel; and transmitting mapping information for indicating the allocation of the at least one logical channel identifier to each of a plurality of point-to-multipoint services, wherein the at least one logical channel identifier has a length of 4 bits.

2. The method of claim 1, wherein the mapping information is generated in the RRC layer.

3. The method of claim 1, wherein the RRC layer transfers the mapping information to the MAC layer.

4. The method of claim 3, wherein the RRC layer is a network side RRC layer and the MAC layer is a network side MAC layer.

5. The method of claim 1, wherein each of the plurality of common logical channels has one-to-one relationship with each of the plurality of point-to-multipoint services.

6. The method of claim 1, wherein the common logical channels are MBMS Traffic Channels (MTCHs).

7. The method of claim 1, wherein the mapping step further comprises multiplexing the at least one data unit of the common logical channels for the common transport channel mapped thereto.

8. The method of claim 7, further comprising transmitting the transferred at least one data unit on a physical channel, wherein the common logical channels are distinguishable due to the at least one logical channel identifier allocated thereto.

9. The method of claim 8, wherein the steps of mapping, transferring, and transmitting allow transmission of multiple multimedia services of different Quality of Service (QoS) or transmission of multiple data streams of different Qos in a single multimedia service.

10. The method of claim 1, wherein the at least one logical channel identifier is in a header of a corresponding data unit.

11. The method of claim 1, wherein the transport channel is a forward access channel (FACH).

12. A method of data reception in a mobile communication system based on a radio interface protocol having a radio resource control (RRC) layer and a medium access control (MAC) layer, the method comprising:
- mapping a plurality of common logical channels of same channel type to a common transport channel, wherein the plurality of common channels of same channel type are located above the MAC layer and the common transport channel is located below the MAC layer;
- receiving at least one data unit through the common transport channel;
- receiving mapping information for indicating the allocation of at least one logical channel identifier to each of a plurality of point-to-multipoint services, wherein the at least one data unit having the at least one logical channel identifier allocated thereto; and
- processing the received at least one data unit according to the at least one logical channel identifier, wherein the at least one logical channel identifier has a length of 4 bits.

13. The method of claim 12, wherein the mapping information is generated in a network side RRC layer.

14. The method of claim 12, wherein the RRC layer transfers the mapping information to the MAC layer.

15. The method of claim 14, wherein the RRC layer is a mobile terminal side RRC layer and the MAC layer is a mobile terminal side MAC layer.

16. The method of claim 12, wherein each of the plurality of common logical channels has one-to-one relationship with each of the plurality of point-to-multipoint services.

17. The method of claim 12, wherein the common logical channels are MBMS Traffic Channels (MTCHs).

18. The method of claim 12, wherein the processing further comprises de-multiplexing the received at least one data unit.

19. The method of claim 18, wherein the processing step further comprises:
- checking the at least one data unit logical channel identifier of the received at least one data unit; and
- delivering each de-multiplexed data unit to a higher layer through a common logical channel designated by the at least one data unit logical channel identifier.

20. The method of claim 12, wherein the mapping, receiving and processing allow reception of multiple multimedia services of different Qos or reception of multiple data streams of different Qos in a single multimedia service.

21. The method of claim 12, wherein the at least one logical channel identifier is in a header of a corresponding data unit.

22. The method of claim 12, wherein the transport channel is a forward access channel (FACH).

* * * * *